United States Patent [19]

Foster, Jr.

[11] Patent Number: 4,851,951
[45] Date of Patent: Jul. 25, 1989

[54] NON-DEFEATABLE SAFETY MECHANICAL ACTUATORS FOR APPLIANCES

[75] Inventor: Robert W. Foster, Jr., Hinsdale, Ill.

[73] Assignee: Associated Mills Inc., Chicago, Ill.

[21] Appl. No.: 209,920

[22] Filed: Jun. 22, 1988

Related U.S. Application Data

[63] Continuation-in-part of Ser. No. 141,928, Jan. 6, 1988.

[51] Int. Cl.$^4$ ............................................... H02H 3/16
[52] U.S. Cl. ........................................ 361/50; 361/42;
307/118; 335/18; 335/24
[58] Field of Search ............... 361/42, 49, 50, 178,
361/115, 114; 307/118, 326; 340/605; 335/21,
26, 24, 18

[56] References Cited

U.S. PATENT DOCUMENTS 4,595,894  6/1986  Doyle et al. ............... 361/42 X
4,709,293 11/1987  Gershen et al. ............ 361/50

Primary Examiner—Todd E. Deboer
Attorney, Agent, or Firm—Laff, Whitesel, Conte & Saret

[57] ABSTRACT

A fail-safe immersion detector has a reset button which may be operated to return an appliance to operation after an immersion-caused short circuit has disappeared. However, if the short circuit remains, an operation of the reset button has no effect. Therefore, the user cannot defeat the fail-safe detector by the expedient of taping or otherwise holding down the reset button. A rocker switch enables a testing of the immersion detector, to be conducted to either side of the A.C. power line while preventing a short circuit across the line if an effort is made to simultaneously conduct tests to both sides of the line. Two test wires extend from the detector through the power cord to the appliance, where they are joined. The immersion detector operates via one of the two wires. The rocker switch conducts the test via the two test wires in series. Therefore, the rocker switch controlled test verifies the integrity of the one test wire.

16 Claims, 1 Drawing Sheet

U.S. Patent    Jul. 25, 1989    4,851,951
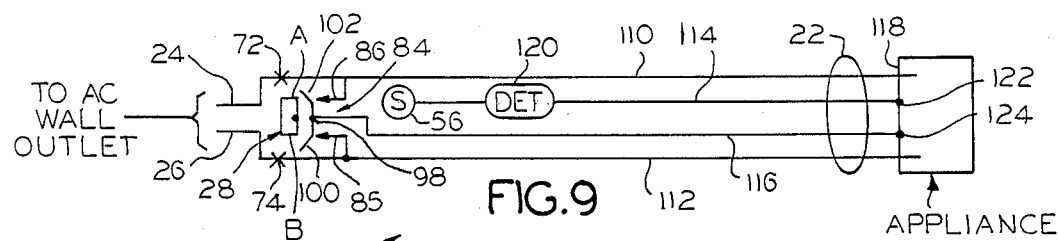
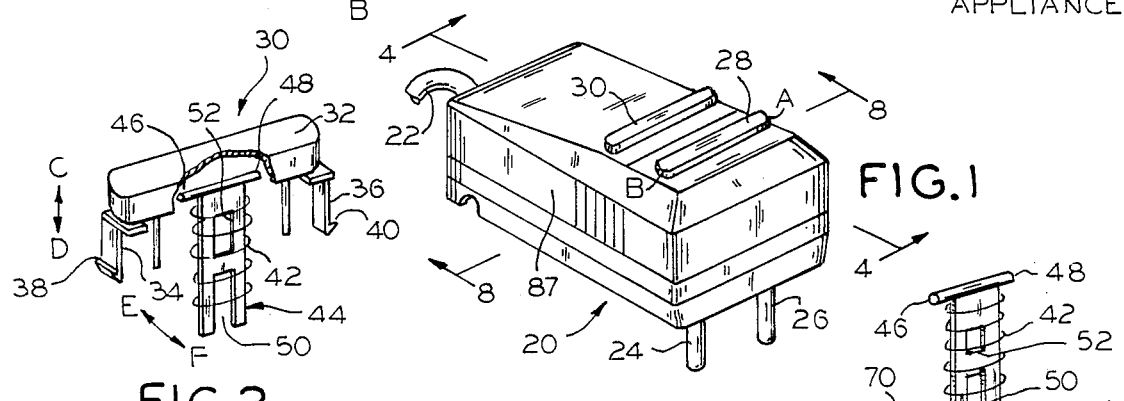
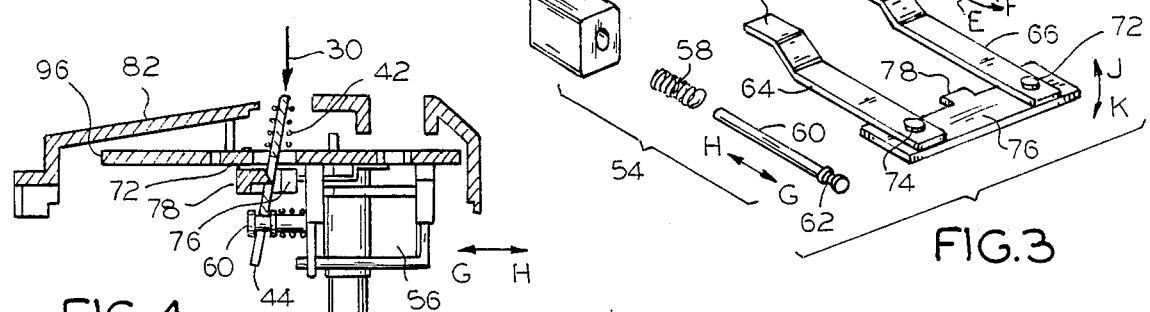
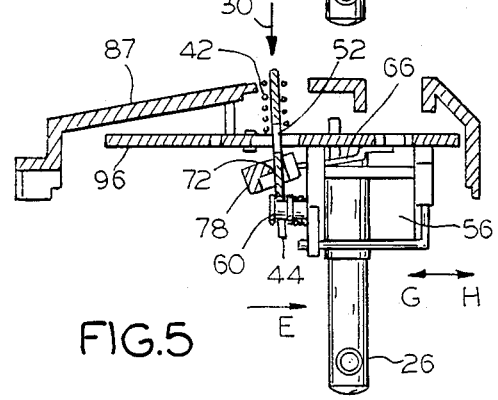
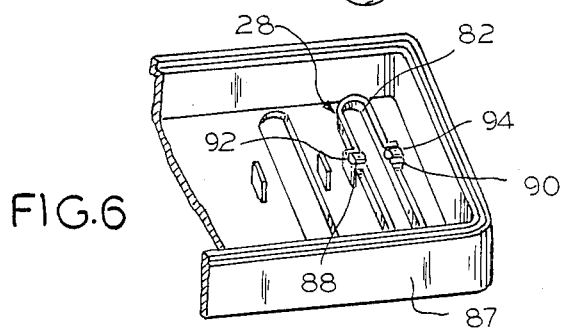
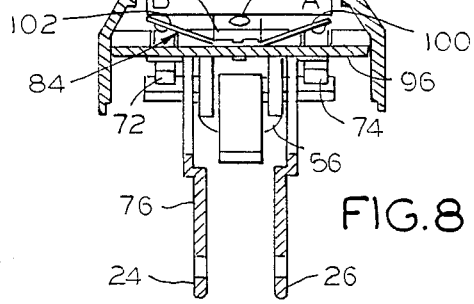

NON-DEFEATABLE SAFETY MECHANICAL ACTUATORS FOR APPLIANCES

This is a continuation-in-part of Ser. No. 07/141,928, filed Jan. 6, 1988.

This invention relates to safety mechanical actuators for appliances and, more particularly, to such mechanical actuators which cannot be defeated by the end user.

Reference is made to a co-pending U.S. patent application entitled "Bipolar Immersion Detection Circuit Interrupter", Ser. No. 07/141,928, filed Jan. 6, 1988, now U.S. Pat. No. 4,823,225. This application describes an electrical circuit for cutting off the A.C. power applied to an appliance when it is immersed in water or otherwise short circuited.

The problem of immersion detection and the resulting A.C. power cut off has become so acute that many appliance manufacturers are now routinely including an immersion detector circuit in their products. Also, governmental and industrial agencies now require devices which cut off the A.C. power to the appliance the instant it encounters enough water to cause a hazardous condition. For example, if a person is using a hair dryer over a sink full of water and if that person drops the hair dryer, the instinctive reaction is to try to catch it before it hits something and breaks. If the hair dryer falls into the sink full of water and if the instinctive reaction causes one to put his hand in the water, electrocution is possible. For this reason, the hair dryer is currently one of the most dangerous of all personal appliances.

One way of cutting off the A.C. power to an appliance is to burn out a link or fuse. However, this usually means that the appliance cannot be repaired at a reasonable cost, and, therefore, must be thrown away. Another way of cutting off power is to trip spring loaded contacts which fly apart when a hazardous condition occurs. Later, the contacts may be closed by pushing a "reset" button, after the appliance has dried out. That way, a hazardous condition does not destroy a product.

The trouble with an appliance having such a reset button is that the user may be tempted to by-pass it if the appliance does not function properly. For example, if a hair dryer is dropped into a body of water and if the immersion detector opens the A.C. power line, the user may not want to do without the dryer until it is completely dry. Therefore, if the reset button does not restore power, the user might be tempted to wrap tape around and permanently hold down the reset button, thus defeating the safety feature. Hence, there may be actions which could close the line switch, and prevent the immersion detector from operating properly. Aside from the need to protect the user from his own folly, various safety approval agencies (such as the Underwriters Laboratories) now require a fail-safe detector which cannot be so defeated by the user.

Accordingly, an object of this invention is to provide new and improved fail-safe reset devices which cannot be defeated by the user. Here, an object is to provide a reset device which can be reset when the device is non-faulty, but which cannot be reset when it is faulty.

Another object of the invention is to provide new and improved immersion detectors which permanently remove A.C. power throughout an entire period while unsafe conditions persist, especially throughout water immersion, or the like. Here, an object is to enable a restoration of power when the fault disappears. In this connection, an object is to preclude the restoration of power if the fault does not disappear.

In keeping with an aspect of the invention, these and other objects are accomplished by providing an appliance with a solenoid which is energized in response to a fault current in order to remove power from the appliance subjected to the fault current. As long as the solenoid remains energized, no action which can be taken by the user will restore power. However, once the fault current disappears, the solenoid is de-energized and the user can restore power. This is accomplished by providing a reset button having a dependent lever which is hinged to swing back and forth in response to the solenoid being energized or de-energized. The reset button acts through the lever to restore power, but only if the lever is swung to the solenoid de-energized position meaning that the fault current has disappeared.

A preferred embodiment of the invention is shown in the attached drawing, wherein:

FIG. 1 is a perspective view of a plug end of an appliance power cord, with the inventive device incorporated therein;

FIG. 2 is a perspective view of a reset push button with a dependent lever arm associated therewith;

FIG. 3 is an exploded view showing a few of the more important parts of the invention;

FIG. 4 is a cross section of the inventive device, taken along line 4—4 of FIG. 1 and showing the reset push button in an enabled or A.C. power contacts closed condition;

FIG. 5 is essentially the same cross section, also taken along line 4—4, with the reset push button in a dis-enabled or power contact open position;

FIG. 6 is a perspective view showing an underside of a housing for the inventive device, to illustrate the mounting of a test button rocker switch;

FIG. 7 shows the housing of FIG. 6 inverted and poised over the reset button and rocker switch contact springs;

FIG. 8 is a cross-section taken along line 8 of FIG. 1 showing the rocker switch and its underlying bias spring and contact completing circuit; and FIG. 9 is a circuit diagram showing how a test circuit may be provided.

The inventive device 20 (FIG. 1) is attached to an end of an electrical power cord 22 leading to any suitable appliance, such as a hair dryer, or the like. The device 20 has two conventional contact blades or terminals 24, 26 which plug into any suitable wall outlet. Depending upon the standard commercial voltage, a suitable potential such as 120 or 240 AC is applied through power cord 22 to whatever appliance is connected to the distant end of the cord 22.

The user controls are a rocker type of test button 28 and a reset button 30. With the appliance contact blades or terminals 24, 26 plugged into a wall outlet, the user may press end A of rocker switch 28 and observe the reset button 30 pop out, showing that the immersion detector works if there is a short to one side of the A.C. line. Then, he can push the reset button 30 and observe that it is operative because it stays in a down position. Next, he may press end B of rocker switch 28 and again observe that the reset switch 30 pops out, showing that the detector works if there is a short circuit to the other side of the A.C. line. Since the test switch 28 can only move to side A or side B to the exclusion of the other side, it is impossible to simultaneously create a short circuit across both sides of the A.C. line by an operation of the test button.

The mechanical construction of the reset button is seen in FIG. 2. One piece part 32 may be molded from plastic, with a pair of sliding arms 34, 36 that enables the reset button to have an up and down motion (directions C, D). A pair of projections 38, 40 on arms 34, 36 limit upward motion (direction C) and prevent the reset button from falling out of the inventive device. A spring 42 urges the push button upwardly (direction C) to a normal position.

A link or lever arm 44 is suspended from trunnions 46, 48 to swing freely in directions E, F, between an enabled position (FIG. 4) and a dis-enabled position (FIG. 5). The lever arm 44 includes a guide track 50 and a capture window 52.

Positioned inside the housing of device 20, a solenoid 54 (FIG. 3) comprises a coil 56, a return spring 52, and an actuator or armature 60. Normally, the spring 58 pushes out (direction G) the actuator or armature 60. When the coil 56 is energized, actuator or armature 60 is pulled in (direction H) against the bias of the spring 58. When the coil is de-energized, the spring 58 again pushes the actuator or armature 60 out in direction G, to a normal position. The outer end 62 of armature 60 has two spaced parallel flanges which slide in the guide track 50 of the link or lever 44. Therefore when actuator or armature 60 retracts (direction H), the link or lever 44 swings in direction E (FIG. 5). When actuator or armature 60 is extended (FIG. 4), link or lever 44 swings in direction F.

Two elongated, cantilevered leaf springs 64, 66 (FIG. 3) are mounted at one of their ends 68, 70 so that their opposite ends swing up or down in directions J, K. The opposite ends of the cantilevered springs 64, 66 carry contacts 72, 74 for closing or opening a circuit to A.C. line 22. The contact ends of leaf springs 64, 66 are joined by an insulating plastic plate 76. When the leaf springs swing in direction J, a latch 78 on plate 76 passes through capture window 52 as the reset button 30 is pushed, provided that the solenoid controlled actuation or armature 60 is extended (direction G) and that link or lever 44 is in its forward position (direction F).

When latch 78 (FIG. 4) is caught in capture window 52, spring 42 holds the plate 76, and, therefore, contacts 72, 74 in a raised position to complete a circuit to the A.C. line. When a fault current is present (FIG. 5) to energize solenoid coil 56, actuator or armature 60 is retracted (direction H), lever arm 44 is pulled in direction E to pull latch 78 out of the capture window 52 in order to disconnect the lever 44 from the leaf springs 64, 66. Spring 42 raises link or lever 44 and makes the reset button 30 pop out of housing 20 (FIG. 1). Leaf springs 64, 66 open the contacts 72, 74 to remove A.C. power from the appliance.

Means are provided for preventing a defeat of the safety feature in response to user action. More particularly, if the reset button 30 is pushed downwardly (FIG. 5) while solenoid coil 56 is energized, (i.e., a fault current is present), the latch 78 cannot engage capture window 52 and the contracts 72, 74 do not close. Therefore, even if the reset button 30 is taped down, the contacts 72, 74 do not close to defeat the safety.

After the fault current disappears, the solenoid 56 is deenergized (FIG. 4) so that armature 60 moves in direction G and link or lever 44 swings in direction F. This time, when reset button 30 is pushed down, the capture window 52 in link or lever arm 44 engages latch 78. When the reset button 30 is released, spring 42 raises latch 78 against the bias of leaf springs 64, 66; therefore, plate 76 is pulled up to close contacts 72, 74. The circuit from the A.C. line is now completed through closed contacts 72, 74 to the appliance.

A rocker switch 28 (FIGS. 6-8) is provided to test the mechanism without a risk that the two sides of the A.C. line will be shorted together. Essentially, the rocker switch 28 comprises a plastic part 82 (FIG. 6), a single leaf spring 84 (FIGS. 7, 8), and two stationary contacts 85, 86 (FIG. 7). The inside of the upper housing 87 (FIG. 6) includes a pair of upstanding, bifurcated fulcrum supports 88, 90 which receive trunnions 92, 94 formed on opposite sides of the rocker button 82. Thus, the button 28 may undertake a rocking or seesaw action about the fulcrum supports 92, 94 when either of the two ends A, B are pushed.

The electronic circuit for breaking the A.C. power line responsive to an immersion of the appliance is mounted on a printed circuit board 96 (FIGS. 7, 8) which fits inside of and is supported by the housing, including upper housing section 87. A central section 98 of leaf spring 84 is attached to the printed circuit board 96 at a location below the center of rocker button 28. Raised ends 100, 102 of the leaf spring 84 bias both ends of the rocker switch button 82 to a raised and neutral position. Beneath each of the raised ends 100, 102 is a stationary contact 85, 86 which is connected to a circuit for testing a corresponding side of the A.C. line.

To test the immersion detector for fault currents to one side of the A. C. lines, end A of rocker button 28 is pushed, causing leaf spring end 100 to make contact with stationary contact 85. When end B is pushed to test immersion detection for fault currents to the other side of the A.C. line, end 102 of leaf spring 84 is pushed to make contact with stationary contact 86. This way, the immersion detector may be tested relative to either side of the A.C. line; however, with the rocking action, it is not possible to simultaneously close both contacts 100, 102 to opposite sides of the line at stationary contacts 85 and 86. Thus, the test procedure does not short circuit the two sides of the A.C. line.

FIG. 9 shows an exemplary test circuit using the rocker switch 28. The two contacts 85, 86 associated with the rocker switch 28 are coupled to opposite sides 110, 112 of the A.C. power line. A test wire 114 extends from the solenoid coil 56 through any suitable immersion detector 120 to the appliance 118, where a suitable connection 122 is made to any suitable device which may be exposed to water upon immersion. For example, connection 122 may be made to the metal frame of a hair dryer. Thus, the solenoid 56 is operated via test wire 114 to remove A.C. power if point 122 is immersed in water. The above identified co-pending patent application Ser. No. 07/141,928 shows one example of a suitable detector for use at 120.

The central section 98 of the leaf spring is connected through a fourth wire 116 to point 124 which is substantially the same as the connection at 122; therefore, wires 114, 116 are connected in series. Perhaps it is connected to the frame of the hair dryer by the same screw or weldment, in the above example. The fourth wire 116 and test wire 114 extend side by side within power cord 22, and, therefore, are exposed to the same environmental conditions. If one of these wires breaks, or burns, or is otherwise damaged, the other will almost certainly also be damaged in a similar manner.

If the rocker switch 28 is rocked by being pushed on end A, contacts 86, 102 close to complete a circuit which may be traced from one side 110 of the A.C. line through contacts 86, 102, fourth wire 116, connections 124, 122, test wire 114, and immersion detector 120 to solenoid 56. If the rocker switch 28 is pushed on end B, a circuit may be traced from the other side 112 of the A.C. line through contacts 85, 100, fourth wire 116, connections 124, 122, test wire 114, and immersion detector 120 to solenoid 56.

If either the test wire 114 or the connection 122 is defective, the circuit will not be closed when rocker switch 28 operates and the solenoid will not operate. On the other hand, if the test circuit is complete, the solenoid 56 operates and opens contacts 72, 74 to remove all A.C. power from the appliance. Thus, it is seen that if the rocker switch 28 is rocked in either direction, and if contacts 72, 74 open, the detector 120, solenoid 56, and test wire 114 (together with any connections 122) are completely operative. Also, it is seen from FIG. 9 that since rocker switch 28 cannot simultaneously close contacts 100, 85 and 102, 86, there is no way to accidentally short circuit the wires 110 and 112 via leaf spring 84.

Many advantages of this use of a fourth test wire should now be apparent. It is desirable to test the integrity of the test wire, which means that either a three-wire cord is used with the test button placed on the appliance or the four-wire cord will be used with the test and reset buttons placed at a single location.

If the test button is placed on the appliance itself, the design of each and every appliance will have to be modified or the original design have to include the specific addition of another part (the test button). It is possible that extra circuitry will have to be placed in the appliance. This multiplies the total costs by the number of appliances.

If the test circuit is literally self-contained within a power cord, one cord may be used with many different appliances, which gives a single one time cost. If a replacement of the detector and test circuit is necessary, it may be accomplished by a substitution of power cords. On the testing of an appliance with the test and reset buttons at the same location, the user can test everything from that single location. There is no need to run back and forth between a test button on the appliance and a reset button on the wall plug.

Other advantages of the four-wire power line cord will readily occur to those who are skilled in the art. Of course, there is no reason why the invention cannot be used with a three-wire cord, with the test button on either the wall plug or the appliance.

Those who are skilled in the art will readily perceive how to modify the invention. Therefore, the following claims are to be construed to include all equivalent structures falling within the spirit and scope of the invention.

What is claimed is:

1. A fail-safe mechanism for resetting an electrical appliance, said mechanism comprising at least one set of contacts which is spring biased to open an electrical circuit directly and individually associated with said appliance, said set of contacts having a latch means, a reset button for closing said contacts against the urging of said spring bias, a movable member which is a lever hinged to and dependent from said reset button, said lever including a guide track and a latching window for receiving said latch means, actuator means riding in said guide track for moving said window toward or away from a position for receiving or releasing said latch means and thus for latching or unlatching said contacts, said reset button moving said movable member for latching said contacts in said closed position when said reset button is released after it has been actuated, and means responsive to detection of an emergency condition for moving said movable member away from said latch means and causing said latch means to move out of said window whereby said spring bias causes said contacts to open, said movable member being shaped and proportioned to provide an entry of said latch into said window in response to an operation of said reset button without a release thereof, said member being moved away from its latching position during said emergency condition, whereby said mechanism cannot be defeated by taping down said reset button.

2. The mechanism of claim 1 wherein said actuator is a solenoid having an armature mounted in said guide track to move said lever.

3. The mechanism of claim 1 wherein there are two elongated spaced parallel, cantilever mounted, leaf springs carrying said contacts and providing said spring bias, an insulating plate member having said latch means thereon, said insulating plate being attached to free ends of said leaf springs in a position so that said latch means may enter said window when said reset button is pushed while said actuator holds said window in said latching position.

4. The mechanism of claim 3 and a spring for restoring said reset button, said restoring spring having a tension which overcomes said spring bias to close said contacts against the urging of said spring bias.

5. The mechanism of claim 1 wherein there are two of said sets of contacts, each of said sets being individually associated with and closing a circuit including a corresponding side of an A.C. line extending to said appliance, and rocker switch means for moving between three positions with a seesaw action for closing a test circuit to either but not simultaneously to both sides of said A.C. line when said rocker switch is rocked between two of said three positions and for opening said test circuit when in a third of said three positions.

6. The mechanism of claim 5 wherein said rocker switch means, comprises an elongated button having a central trunnion mounted on a fulcrum support for giving said seesaw action, and an elongated leaf spring mounted under and in alignment with said elongated button, said leaf spring being anchored at its center and having raised ends on opposite sides of said center to bias said rocker switch to said third position, said leaf spring also carrying current when said test circuit is closed to either side of said line.

7. The mechanism of claim 6 and means comprising a power cord including said A.C. line, a test wire coupled to operate said actuator, and another wire coupled to said leaf spring, one side of said A.C. line being coupled to be engaged by said leaf spring when said rocker switch rocks in one direction, and the other side of said A.C. line being coupled to be engaged by said leaf spring when said rocker rocks in an opposite direction, said test and another wire being joined at said appliance whereby an operation of said actuator indicates that said test wire is in an operative condition.

8. The mechanism of claim 7 wherein said test and another wires encounter virtually identical environments so that any extraordinary condition experienced by said test wire is also experienced by said another wire.

9. An immersion detector comprising a device at one end of a power cord, said device having at least two terminals for plugging into an A.C. wall outlet, said power cord carrying power from said wall outlet through said terminals to an appliance at the other end of said power cord, means in said device responsive to an immersion of said appliance for opening said power cord to remove said power from said appliance, manual reset means in said device for restoring said power after danger from said immersion has disappeared, and means for preventing permanent restoration of said power responsive to an action by a user of the appliance before said danger from said immersion has diappeared, said detector further comprising means for testing said immersion detector, said detecting means includes two test wires in said power cord said test wires being joined in said appliances, means for conducting said test via said two wires, and means for detecting immersion over one of said wires whereby a test conducted via said two wires verifies the integrity of said one wire.

10. The detector of claim 9 wherein said manual reset means is a push button, and said means for preventing is a fail-safe means attached to said push button for enabling said removal of power and for precluding an effective operation of said push button for accomplishing permanent restoration of power by an operation of said push button during hazardous conditions.

11. The detector of claim 10 wherein said fail-safe means comprises a mechanical link having a pivot for pivotally associating said link with said push button, said pivot enabling said link to be moved between an enabled and a disenabled condition, and means for selectively operating said link to said disenabled condition in response to an emergency condition caused by an immersion of said appliance and for returning said link to an enabled condition in response to an end of said emergency condition, said means for opening said power cord including contacts which may be closed only when said link is in said enabled condition.

12. The detector of claim 9 wherein said manual reset means comprises a push button, power restoration means comprising a link coupled to said push button to move back and forth between two positions, said means for opening said power cord comprises an immersion actuated solenoid for moving said link between first and second of said two positions, and said means for preventing permanent restoration of said power comprises a latching mechanism which is geometrically ineffective to close said opened power cord when said link is in one of said two positions.

13. The detector of claim 12 wherein said latching mechanism comprises a pair of cantilever-mounted leaf springs each having an A.C. power carrying contact thereon, a latch mounted on said leaf springs to hold said A.C. contacts in a closed position, said link having a window into which said latch may fit only when said link is in said first position, and a spring associated with said push button for moving said leaf springs against their spring bias and via said latch and window to close said two A.C. power carrying contacts when said link is in said first position but not when said link is in said second position.

14. The detector of claim 9 and means for testing said immersion detector with respect to either but not simultaneously both of said two terminals.

15. The detector of claim 9 wherein said testing means comprises a rocker switch mounted for seesaw motion between two extreme positions with a neutral position there between, at least two test contacts individually associated with said two extreme positions, a corresponding one of said test contacts being selectively closed by said rocker switch in each of said two extreme positions, each of said contacts being individually associated with a corresponding one of said terminals, and means for normally biasing said rocker switch to said neutral position where neither of said test contacts is closed by said rocker switch.

16. The detector of claim 15 wherein said means for normally biasing comprises an elongated leaf spring fastened at a middle section beneath a center section of said rocker switch, the outside ends of said leaf spring being raised relative to said center section in order to spring bias said rocker switch to said neutral position, the ends of said leaf spring also forming said test contacts for completing circuits to said terminals when said rocker switch is moved to either of said two extreme positions.

* * * * *